(12) United States Patent
Perneti et al.

(10) Patent No.: US 11,243,705 B2
(45) Date of Patent: Feb. 8, 2022

(54) METHOD AND SYSTEM FOR POLICY CLASS BASED DATA MIGRATION

(71) Applicant: EMC IP Holding Company LLC, Hopkinton, MA (US)

(72) Inventors: Jayanth Kumar Reddy Perneti, Bangalore (IN); Rahul Deo Vishwakarma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/529,775

(22) Filed: Aug. 1, 2019

(65) Prior Publication Data

US 2021/0034273 A1    Feb. 4, 2021

(51) Int. Cl.
*G06F 3/06* (2006.01)
*G06F 12/02* (2006.01)
*G06F 9/50* (2006.01)

(52) U.S. Cl.
CPC .......... *G06F 3/0647* (2013.01); *G06F 3/0604* (2013.01); *G06F 3/067* (2013.01); *G06F 9/5011* (2013.01); *G06F 12/0253* (2013.01); *G06F 2209/501* (2013.01); *G06F 2212/1044* (2013.01)

(58) Field of Classification Search
CPC .... G06F 3/0647; G06F 3/067; G06F 12/0253; G06F 3/0604; G06F 2212/1044; G06F 2209/501
See application file for complete search history.

(56) References Cited

U.S. PATENT DOCUMENTS

| | | | |
|---|---|---|---|
| 10,416,919 B1* | 9/2019 | Cai | G06F 3/0605 |
| 2009/0228655 A1* | 9/2009 | Yamane | G06F 3/0649 711/117 |
| 2012/0023233 A1* | 1/2012 | Okamoto | G06F 9/4856 709/226 |
| 2015/0193250 A1* | 7/2015 | Ito | G06F 9/45558 718/1 |
| 2020/0327069 A1* | 10/2020 | Kang | G06F 12/0253 |

\* cited by examiner

*Primary Examiner* — Michelle T Bechtold
(74) *Attorney, Agent, or Firm* — Chamberlain, Hrdlicka, White, Williams & Aughtry

(57) ABSTRACT

A method and system for policy class based data migration. Specifically, the method and system disclosed herein entail dynamically changing policy classes with which any given data migration may be associated while the given data migration is transpiring. In transitioning between policy classes, different levels of resources, available to different policy classes, respectively, may be allocated to supporting the given data migration.

19 Claims, 4 Drawing Sheets

METHOD AND SYSTEM FOR POLICY CLASS BASED DATA MIGRATION

BACKGROUND

Numerous issues may plague, and subsequently cause failures to occur on, backup storage systems. One such issue pertains to the unexpected consumption of available storage capacity thereon. Current strategies directed to thwarting this issue, including the manual performance of capacity reclamation by users and administrators, remain substantively ineffective.

SUMMARY

In general, in one aspect, the invention relates to a method for intelligent data migration. The method includes identifying criteria for changing policy classes, selecting an active data migration policy from a set of active data migration policies, making a first determination that a criterion of the criteria for changing policy classes is met, changing, based on the first determination, a first policy class of the active data migration policy to a second policy class, allocating a first level of a system resource associated with the second policy class to support data migration, and performing the data migration of data identified in the active data migration policy using the first level of the system resource.

In general, in one aspect, the invention relates to a system. The system includes a backup storage system including a computer processor configured to identify criteria for changing policy classes, select an active data migration policy from a set of active data migration policies, make a determination that a criterion of the criteria for changing policy classes is met, change, based on the determination, a first policy class of the active data migration policy to a second policy class, allocate a first level of a system resource associated with the second policy class to support data migration, and perform the data migration of data identified in the active data migration policy using the first level of the system resource.

In general, in one aspect, the invention relates to a non-transitory computer readable medium (CRM). The non-transitory CRM includes computer readable program code, which when executed by the computer processor, enables the computer processor to identify criteria for changing policy classes, select an active data migration policy from a set of active data migration policies, make a determination that a criterion of the criteria for changing policy classes is met, change, based on the determination, a first policy class of the active data migration policy to a second policy class, allocate a first level of a system resource associated with the second policy class to support data migration, and perform the data migration of data identified in the active data migration policy using the first level of the system resource.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish, between the elements. By way of an example, a first element is distinct from a second element, and a first element may encompass more than one element and succeed (or precede) the second element in an ordering of elements.

In general, embodiments of the invention relate to a method and system for policy class based data, migration. Specifically, one or more embodiments of the invention entails dynamically changing policy classes with which any given data migration may be associated while the given data migration is transpiring. In transitioning between policy classes, different levels of resources, available to different policy classes, respectively, may be allocated to supporting the given data migration.

Figure 1:
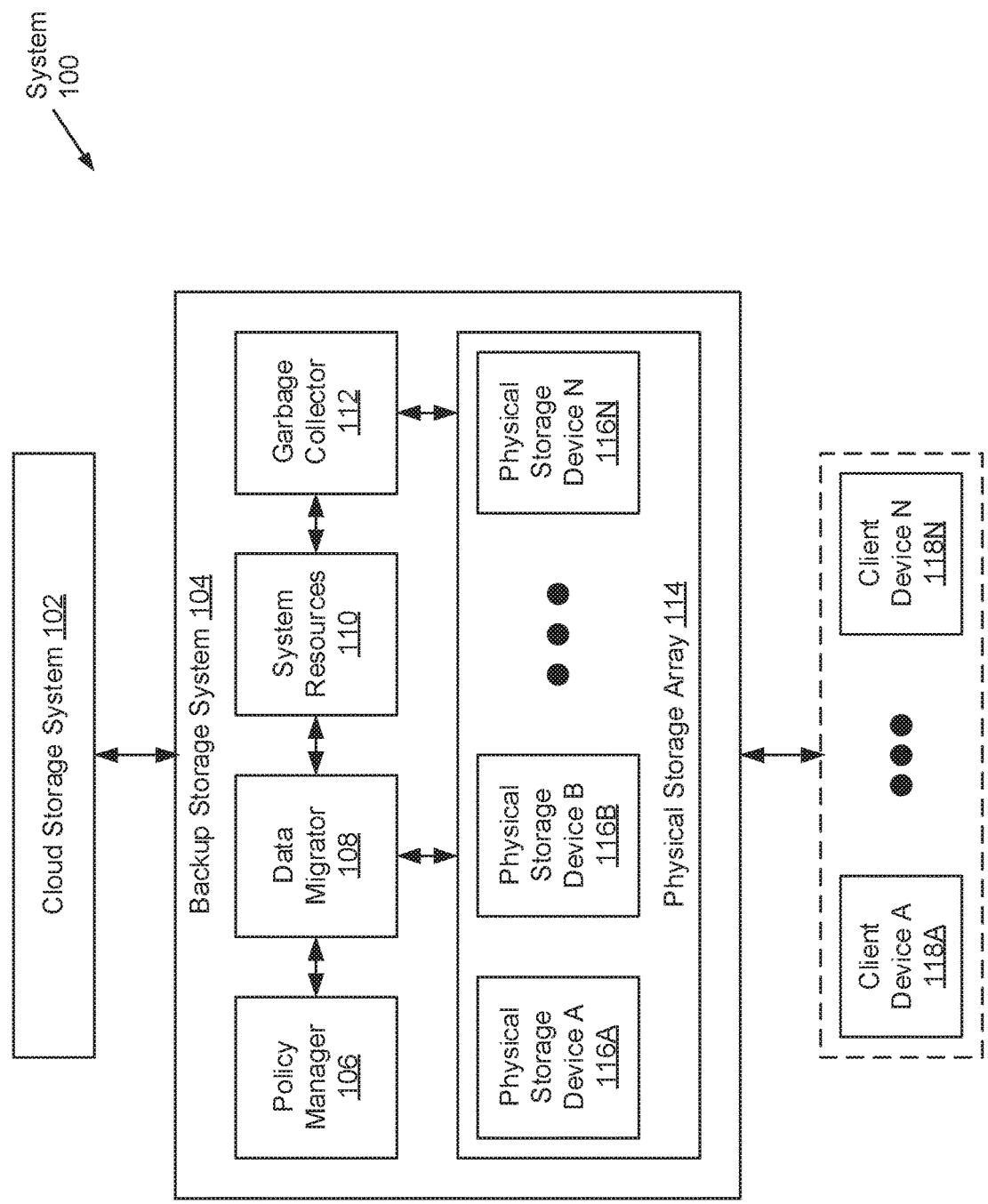
FIG. 1 shows a system in accordance with one or more embodiments of the invention.

FIG. 1 shows a system in accordance with one or more embodiments of the invention. The system (100) may include a cloud storage system (102) operatively connected to a backup storage system (104). The backup storage system (104) may, in turn, operatively connect to one or more client devices (118A-118N). Each of these system (100) components is described below.

In one embodiment of the invention, the above-mentioned system (100) components may operatively connect to one another through a network (not shown) (e.g., a local area network (LAN), a wide array network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the cloud storage system (102) may represent a data backup, archiving, and/or disaster recovery storage system. The cloud storage system (102) may be implemented using one or more servers (not shown). Each server may be a virtual server, which may reside in a cloud computing environment. Additionally or alternatively, the cloud storage system (102) may be implemented using one or more virtual computing systems, which may emulate physical computing systems similar to the exemplary computing system shown in FIG. 3. Further, the cloud storage system (102) may consolidate various forms of data such as, for example, cold (i.e., never accessed) data and/or select accessed data that had once resided on the backup storage system (104).

In one embodiment of the invention, the backup storage system (104) may represent a data backup, archiving, and/or disaster recovery storage system. The backup storage system (104) may be implemented using one or more servers (not shown). Each server may be a physical server, which may reside in a datacenter. Additionally or alternatively, the backup storage system (104) may be implemented using one or more physical computing systems similar to the exemplary computing system shown in FIG. 3. Furthermore, the backup storage system (104) may include a policy manager (106), a data migrator (108), system resources (110), a garbage collector (112), and a physical storage array (114). Each of these backup storage system (104) subcomponents is described below.

In one embodiment of the invention, the policy manager (106) may refer to a computer program that may execute on the underlying hardware of the backup storage system (104). Specifically, the policy manager (106) may be designed and configured to manage one or more data migration policies, which may have been created and configured on the backup storage system (104). To that extent, the policy manager (106) may include functionality to execute a data migration process for each managed data migration policy. A given data migration process may entail the replication and/or movement of specified data, identified in a given data migration policy, from the backup storage system (104) to one or more cloud storage systems (102). Further, the policy manager (106) may include further functionality to execute a given data migration process through the consumption of up to a level of backup storage system resources allocated to the given data migration process based on a policy class associated with a given data migration policy. Moreover, the policy manager (106) may also include functionality to steer the performance of a given data migration process based on one or more prescribed data migration priorities or metrics (described below).

In one embodiment of the invention, the data migrator (108) may refer to a computer program that may execute on the underlying hardware of the backup storage system (104). Specifically, the data migrator (108) may be designed and configured to move or transfer data between storage locations. To that extent, the data migrator (108) may include functionality to offload or copy data, occupying limited storage capacity on the backup storage system (104), to one or more cloud storage systems (102) and/or any other data archive (not shown). The aforementioned data, which may be transferred between storage locations, may include accessed (i.e., frequently accessed or hot) data selected by a user or administrator of the backup storage system (104); and/or untouched (i.e., never accessed or cold) data identified by the backup storage system (104) based at least on data size and data age. Furthermore, data migration may be directed to the long-term retention of the selected, migrated data, as well as for the reclamation of limited available storage resources on the backup storage system (104).

In one embodiment of the invention, a system resource (110) may refer to any physical or virtual component of limited availability within the backup storage system (104). By way of an example, a system resource (110) may include, but is not limited to, a compute resource—i.e., a measurable quantity of a compute-relevant resource type that can be requested, allocated, and consumed. More specifically, a compute resource may pertain to a physical device (i.e., hardware), a logical intelligence (i.e., software), or a combination thereof, which may provide computing and/or processing functionality on the backup storage system (104). Central processing units (CPU), graphics processing units (GPU), and/or memory (e.g., random access memory (RAM)) may exemplify compute resources residing on the backup storage system (104). System resources (110) may not be limited to compute resources and/or the aforementioned examples of compute resources. For example, system resources (110) may further include, but are not limited to, storage resources (e.g., physical storage device (116A-116N) capacity), virtualization resources (e.g., virtual machine (not shown) processing), and network resources (e.g., bandwidth).

In one embodiment of the invention, the garbage collector (112) may refer to a computer program that may execute on the underlying hardware of the backup storage system (104). Specifically, the garbage collector (112) may be designed and configured to, periodically per a schedule or on-demand, reclaim (i.e., free-up) storage capacity on the backup storage system (104), which may no longer be in active use. Storage capacity that may be reclaimed may include, for example, storage capacity occupied by expired directory snapshots and storage capacity occupied by cold data. The garbage collector (112) is not limited to reclaiming storage capacity in accordance with the aforementioned examples. Further, one of ordinary skill will appreciate that the garbage collector (112) may perform other functionalities without departing from the scope of the invention.

In one embodiment of the invention, the physical storage array (114) may refer to a collection of one or more physical storage devices (116A-116N) on which various forms of data—e.g., backup copies of data found on the client device(s) (118A-118N)—may be consolidated. Each physical storage device (116A-116N) may encompass non-transitory computer readable storage media on which data may be stored in whole or in part, and temporarily or permanently. Further, each physical storage device (116A-116N) may be designed and configured based on a common or different storage device technology—examples of which may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, any subset or all physical storage device(s) (116A-116N) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a client device (118A-118N) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, a client device (118A-118N) may include and allocate various resources (e.g., computer processors, memory, storage, virtualization, network bandwidth, etc.), as needed, to the computer programs and the tasks (or processes) instantiated thereby. One of ordinary skill will appreciate that a client device (118A-118N) may perform other functionalities without departing from the scope of the invention. Examples of a client device (118A-118N) may include, but are not limited to, a desktop computer, a laptop computer, a tablet computer, a server, a mainframe, or any other computing system similar to the exemplary computing system shown in FIG. 3.

While FIG. 1 shows a configuration of components, other system configurations may be used without departing from the scope of the invention. For example, the system (100) may further include a second cloud storage system (not shown), whereto the data migration of select data, residing on the backup storage system (104), may be directed to the second cloud storage system in addition to the cloud storage system (102) or, alternatively, to the second cloud storage system instead of the cloud storage system (102).

Figure 2A:
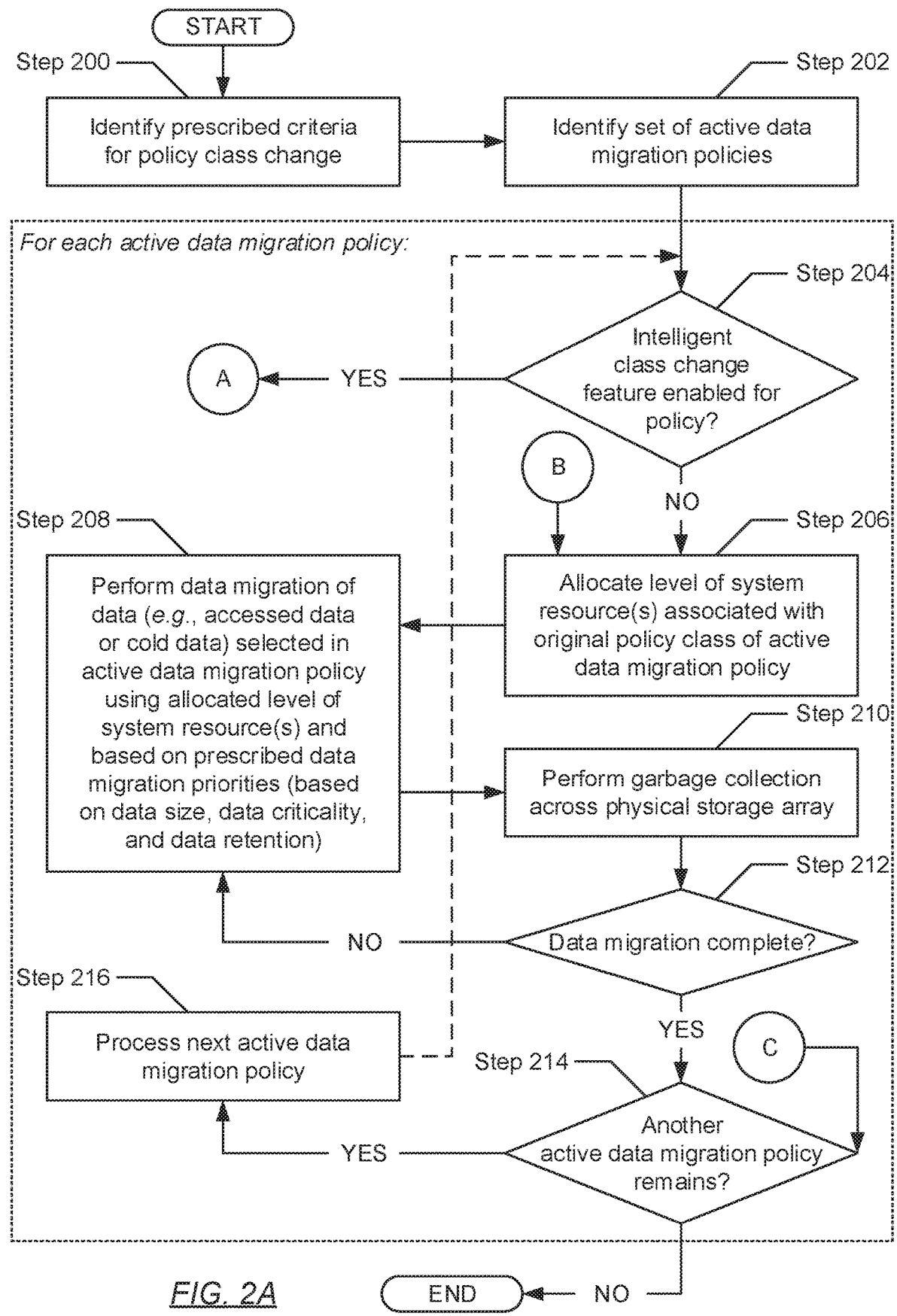
FIGS. 2A and 2B show flowcharts describing a method for migrating data based on policy classes in accordance with one or more embodiments of the invention.
Figure 2B:
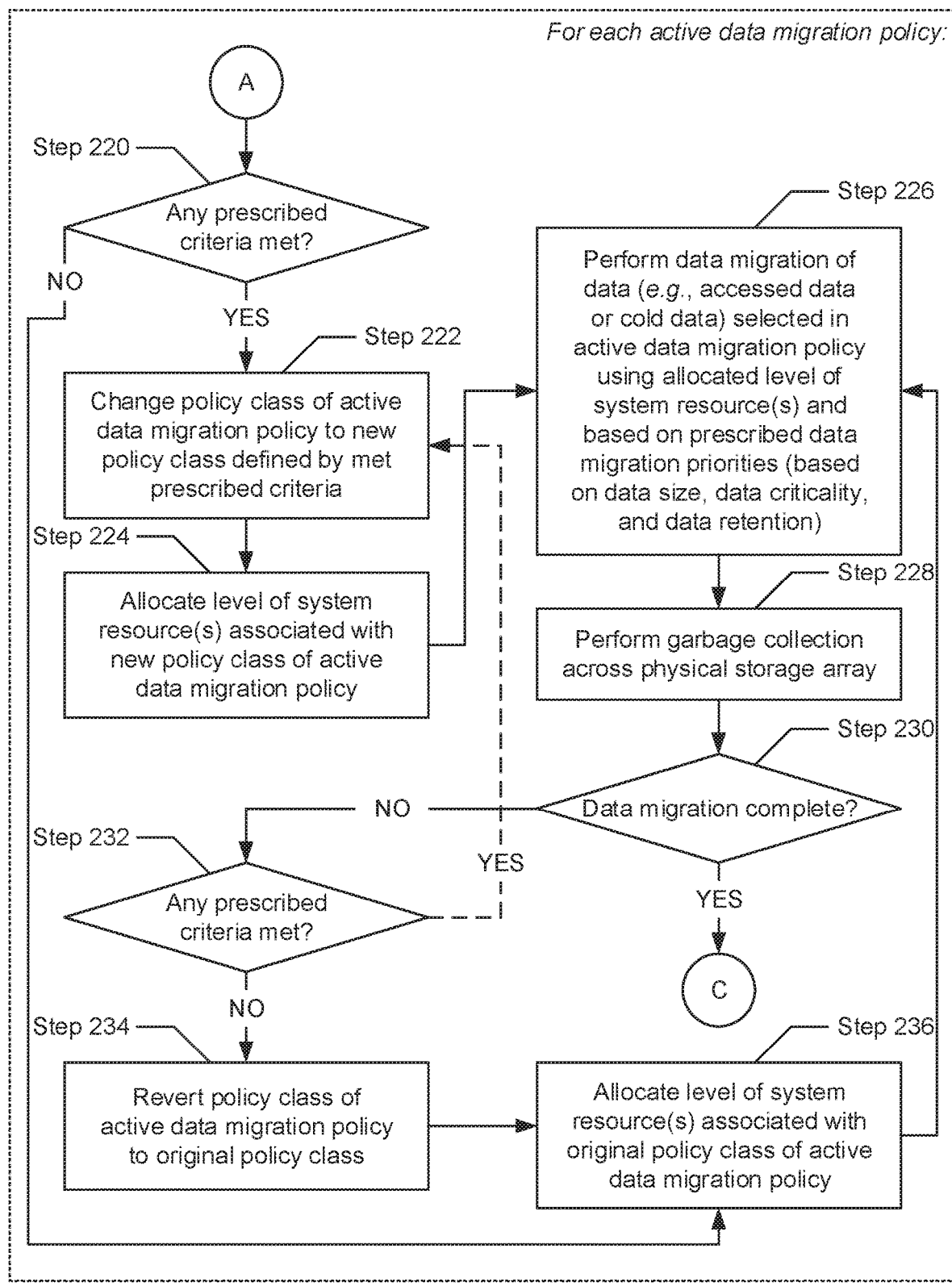

FIGS. 2A and 2B show flowcharts describing a method for migrating data based on policy classes in accordance with one or more embodiments of the invention. The various steps outlined below may be performed by the backup storage system (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, prescribed criteria for policy class change is identified. In one embodiment of the invention, the prescribed criteria may refer to one or more configurable requirements (to be matched or met) for upgrading, downgrading, or reverting a policy class with which an active data migration policy may be associated. The prescribed criteria may be configured by administrators of the backup storage system. Further, by way of examples, the prescribed criteria may include, but are not limited to, any subset or all of the following requirements: a consumed amount or percentage of storage capacity on the backup storage system exceeding a threshold value; a data retention length of time meeting a cost efficiency threshold; and a satisfaction of one or more compliance requirements. The prescribed criteria is not limited to the aforementioned examples.

In Step 202, a set of one or more active data migration policies is identified. In one embodiment of the invention, an active data migration policy may refer to a task or job directed to the migration of particular data from one storage location (e.g., the backup storage system) to another (e.g., one or more cloud storage systems). Further, each active data migration policy may specify or include various properties or attributes, which may have been populated during an initial creation and configuration of the active data migration policy on the backup storage system by an administrator.

In one embodiment of the invention, these attributes may be descriptive of the active data migration policy and/or may be pertinent to executing an associated data migration process. These attributes may include, but are not limited to, a policy name associated with the active data migration policy; a creation timestamp encoding a date and/or time on which the active data migration policy had been created; specified data representative of data selected or identified to be migrated; a policy class (e.g., "platinum", "gold", "silver", "bronze", etc.) definitive of the level of backup storage system resources that may be allocated to the associated data migration process; and a feature status reflective of whether the associated data migration process should be executed in consideration of an intelligent class change feature (described below).

In one embodiment of the invention, the above-mentioned specified data, selected or identified for migration in a given active data migration policy, may represent cold data or, alternatively, accessed data. Cold data may refer to untouched (or never accessed) data residing on the backup storage system, which may be identified through criteria defined by an administrator. In contrast, accessed data may refer to any data, residing on the backup storage system, that has—to some degree been interacted with since the initial consolidation of the data on the backup storage system. Furthermore, in general, whether the specified data refers to cold data or accessed data, data on the backup storage system may be representative of one or more directory snapshots. A directory snapshot may refer to a read-only copy of a given filesystem directory (or database) created at a given point in time, which may be used as a restore or rollback point for a given client device.

In one embodiment of the invention, the above-mentioned criteria by which a given data may be identified as cold data, may be based at least on a data size and/or a data age, associated with given data. The data size associated with a given data may refer to the amount of information, expressed in bytes, contained in the given data. On the other hand, the data age associated with a given data may refer to an amount or length of time that has elapsed since the given data has been stored on the backup storage system. By way of examples, the cold data identification criteria may include, but is not limited to, any subset of the following conditions: stored data of any data size, stored data having a data size larger than a first threshold data size, stored data having a data size smaller than a second threshold data size, stored data exhibiting any data age, stored data exhibiting a data age matching a specified data, age, stored data exhibiting a data age within a specified range of data ages (e.g., between a specified minimum data age and a specified maximum data age), or any combination thereof. The cold data identification criteria is not limited to the aforementioned example conditions.

Hereinafter, the remaining steps (i.e., Steps 204 to 236) outlined and described below may be performed for each active data migration policy of the set of active data migration policies (identified in Step 202).

In Step 204, a determination is made as to whether an intelligent class change feature is enabled for the active data migration policy (i.e., currently being processed). During the creation and configuration of the active data migration policy, an administrator may or may not have opted to enable the intelligent class change feature, which activates an intelligent data migration functionality of the backup storage system (implemented through one or more embodiments of the invention) and applies that functionality whilst the active data migration policy is executed. Further, the determination may, for example, entail seeking a configuration file associated with the active data migration policy; and identifying the recorded value (e.g., "enabled" or "disabled") mapped to a feature-relevant variable specified therein. Accordingly, in one embodiment of the invention, if it is determined that the intelligent class change feature is enabled for the active data migration policy, then the process proceeds to Step 220 (see e.g., FIG. 2B). On the other hand, in another embodiment of the invention, if it is alternatively determined that the intelligent class change feature is disabled for the active data migration policy, then the process alternatively proceeds to Step 206.

In Step 206, after determining (in Step 204) that the above-mentioned intelligent class change feature is disabled for the active data migration policy, an original policy class of the active data migration policy is identified. In one embodiment of the invention, an original policy class associated with a given active data migration policy may refer to a policy class, assigned to the given active data migration policy, by an administrator during a creation and configuration of the given active data migration policy. Further, identification of the original policy class, associated with the active data migration policy, may, for example, entail seeking a configuration file associated with the active data migration policy; and identifying the recorded value (e.g., "platinum", "gold", "silver", "bronze", etc.) mapped to a class-relevant variable specified therein.

In one embodiment of the invention, following the identification of the original policy class of the active data migration policy, a level pair of backup storage system resources—associated with the original policy class—may be allocated to support the upcoming data migration and garbage collection processes. The level pairs of backup storage system resources, associated with the various policy classes available on the backup storage system, may have been prescribed thereon during a pre-deployment phase of the backup storage system. Furthermore, a level pair may refer to a two-element data tuple encompassing: a first element specifying an amount or percentage of backup storage system resources to be directed to the data migration process; and a second element specifying an amount or percentage of backup storage system resources to be directed to the garbage collection process.

In Step 208, a data migration process entailing the offloading of specified data, identified in the active data migration policy, is initiated/performed. In one embodiment of the invention, the aforementioned specified data may refer to cold (i.e., never accessed) data identified by the backup storage system, or accessed data selected by an administrator during the creation and configuration of the active data migration policy. Further, the data migration process may entail the replication and/or movement of the specified data from the backup storage system to one or more cloud storage systems. Moreover, the data migration process may consume up to the level of backup storage system resources (allocated to the data migration process in Step 206). Accordingly, a performance of the data migration process may be influenced based on the allocated level of backup storage system resources.

In one embodiment of the invention, the performance of above-mentioned data migration process may further be influenced based on one or more prescribed data migration priorities. A prescribed data migration priority may refer to a metric that defines an order or ranking by which the specified data, of a given active data migration policy, may be offloaded to one or more cloud storage systems. By way of examples, the prescribed data migration priorities may be tied to any subset or all of the following metrics: a data size associated with the specified data; a data criticality assigned to the specified data; and a data retention associated with the specified data. The prescribed data migration priorities are not limited to the aforementioned examples.

In Step 210, a garbage collection process is initiated/performed on the backup storage system. In one embodiment of the invention, garbage collection may refer to the reclamation (or freeing-up) of storage capacity, identified to contain never accessed or expired data (e.g., directory snapshots), on the backup storage system (or more specifically, the physical storage array residing thereon). Specifically, by way of an example, the garbage collection process may reclaim any granularity of storage capacity (e.g., a sector, a block spanning multiple sectors, etc.) identified by address and cleared for reclamation, which may be specified in a reclamation whitelist. In an exemplary scenario, the aforementioned reclamation whitelist may be populated by the data migration process following the replication and migration of data, stored at a specified source location or address (on the backup storage system), to a specified destination location or address (on a cloud storage system). In such a scenario, the data migration process may update the reclamation whitelist with the specified source location or address, thereby authorizing the reclamation of the associated storage capacity by the garbage collection process. Further, the garbage collection process may transpire whilst the data migration process (initiated in Step 208) is still underway or, alternatively, after the data migration process completes. Moreover, the garbage collection process may consume up to the level of backup storage system resources (allocated to the garbage collection process in Step 206). Accordingly, a performance of the garbage collection process may be influenced based on the allocated level of backup storage system resources.

In Step 212, a determination is made as to whether the data migration process (initiated in Step 208) is complete. Accordingly, in one embodiment of the invention, if it is determined that the data migration process is complete, then the process proceeds to Step 214. On the other hand, in another embodiment of the invention, if it is alternatively determined that the data migration process has not been completed yet, then the process alternatively proceeds to Step 208, where the data migration process continues to be performed.

In Step 214, after determining (in Step 212 or Step 230) that the data migration process (initiated in Step 208 or Step 226) has completed, a determination is made as to whether any active data migration policies, of the set of active data migration policies (identified in Step 202), remains to be processed. Accordingly, in one embodiment of the invention, if it is determined that at least one other active data migration policy remains to be processed, then the process proceeds to Step 216. On the other hand, in another embodiment of the invention, if it is alternatively determined that no more active data migration policies remain to be processed, then the process ends.

In Step 216, after determining (in Step 214) that at least one other active data migration policy, of the set of active data migration policies (identified in Step 202), remains to be processed, a next active data migration policy is selected for processing. The process subsequently proceeds to Step 204, where processing of the next active data migration policy commences.

Turning to FIG. 2B, in Step 220, after alternatively determining (in Step 204) that an intelligent class change feature (described above) is enabled for the active data migration policy, a determination is made as to whether any (i.e., at least one requirement specified by the) prescribed criteria (identified in Step 200) is met. Accordingly, in one embodiment of the invention, if it is determined that at least one requirement specified by the prescribed criteria has been met, then the process proceeds to Step 222. On the other hand, in another embodiment of the invention, if it is alternatively determined that none of the requirement(s) specified by the prescribed criteria has/have been met, then the process alternatively proceeds to Step 236.

In Step 222, after determining (in Step 220) that at least one requirement specified by the prescribed criteria (identified in Step 200) has been met, an existing policy class of the active data migration policy is changed. Specifically, in one embodiment of the invention, the existing policy class of the active data migration policy may be upgraded or downgraded to a new policy class, where the new policy class may be defined by the prescribed criteria requirement(s) that had been met. An existing policy class of the active data migration policy may refer to the original policy class (described above) or a previous new policy class defined by a previously met requirement specified by the prescribed criteria checked during an earlier stage of the data migration process (initiated/performed in Step 226). Further, changing the existing policy class of the active data migration policy to the new policy class may, for example, entail seeking a configuration file associated with the active data migration policy; identifying the recorded value (e.g., "platinum", "gold", "silver", "bronze", etc.) reflective of the existing policy class—mapped to a class-relevant variable specified therein; and replacing the recorded value with another value reflective of the new policy class.

In Step 224, a level pair of backup storage system resources—associated with the new policy class may be allocated to support the upcoming data migration and garbage collection processes. The level pairs of backup storage system resources, associated with the various policy classes available on the backup storage system, may have been prescribed thereon during a pre-deployment phase of the backup storage system. Furthermore, a level pair may refer to a two-element data tuple encompassing: a first element specifying an amount or percentage of backup storage system resources to be directed to the data migration process; and a second element specifying an amount or percentage of backup storage system resources to be directed to the garbage collection process.

In Step 226, a data migration process entailing the offloading of specified data, identified in the active data migration policy; is initiated/performed. In one embodiment of the invention, the aforementioned specified data may refer to cold (i.e., never accessed) data identified by the backup storage system, or accessed data selected by an administrator during the creation and configuration of the active data migration policy. Further, the data migration process may entail the replication and/or movement of the specified data from the backup storage system to one or more cloud storage systems. Moreover, the data migration process may consume up to the level of backup storage system resources (allocated to the data migration process in Step 224 or Step 236). Accordingly, a performance of the data migration process may be influenced based on the allocated level of backup storage system resources.

In one embodiment of the invention, the performance of the above-mentioned data migration process may further be influenced based on one or more prescribed data migration priorities. A prescribed data migration priority may refer to a metric that defines an order or ranking by which the specified data, of a given active data migration policy, may be offloaded to one or more cloud storage systems. By way of examples, the prescribed data migration priorities may be tied to any subset or all of the following metrics: a data size associated with the specified data; a data criticality assigned to the specified data; and a data retention associated with the specified data. The prescribed data migration priorities are not limited to the aforementioned examples.

In Step 228, a garbage collection process is initiated/performed on the backup storage system. In one embodiment of the invention, garbage collection may refer to the reclamation (or freeing-up) of storage capacity, identified to contain never accessed or expired data (e.g., directory snapshots), on the backup storage system (or more specifically, the physical storage array residing thereon). Specifically, by way of an example, the garbage collection process may reclaim any granularity of storage capacity (e.g., a sector, a block spanning multiple sectors, etc.) identified by address and cleared for reclamation, which may be specified in a reclamation whitelist. In an exemplary scenario, the aforementioned reclamation whitelist may be populated by the data migration process following the replication and migration of data, stored at a specified source location or address (on the backup storage system), to a specified destination location or address (on a cloud storage system). In such a scenario, the data migration process may update the reclamation whitelist with the specified source location or address, thereby authorizing the reclamation of the associated storage capacity by the garbage collection process. Further, the garbage collection process may transpire whilst the data migration process (initiated in Step 226) is still underway or, alternatively, after the data migration process completes. Moreover, the garbage collection process may consume up to the level of backup storage system resources (allocated to the garbage collection process in Step 224 or Step 236). Accordingly, a performance of the garbage collection process may be influenced based on the allocated level of backup storage system resources.

In Step 230, a determination is made as to whether the data migration process (initiated in Step 226) is complete. Accordingly, in one embodiment of the invention, if it is determined that the data migration process is complete, then the process proceeds to Step 214 (see e.g., FIG. 2A). On the other hand, in another embodiment of the invention, if it is alternatively determined that the data migration process has not been completed yet, then the process alternatively proceeds to Step 232.

In Step 232, after determining (in Step 230) that the data migration process (initiated in Step 226) has completed, a determination is made as to whether any (i.e., at least one requirement specified by the) prescribed criteria (identified in Step 200) is met. Accordingly, in one embodiment of the invention, if it is determined that at least one requirement specified by the prescribed criteria has been met, then the process proceeds to Step 222. On the other hand, in another embodiment of the invention, if it is alternatively determined that none of the requirement(s) specified by the prescribed criteria has/have been met, then the process alternatively proceeds to Step 234.

In Step 234, after determining (in Step 232) that none of the requirement(s) specified by the prescribed criteria (identified in Step 200) has been met, the new policy class of the active data migration policy is reverted back to the original policy class. Specifically, in one embodiment of the invention, the new policy class of the active data migration policy may be upgraded or downgraded to the original policy class. Changing the new policy class of the active data migration policy to the original policy class may, for example, entail seeking a configuration file associated with the active data migration policy; identifying the recorded value (e.g., "platinum", "gold", "silver", "bronze", etc.)—reflective of the existing (i.e., new) policy class mapped to a class-relevant variable specified therein; and replacing the recorded value with another value reflective of the original policy class.

In Step 236, after alternatively determining (in Step 220) that none of the requirement(s) specified by the prescribed criteria (identified in Step 200) has been met, or following the reversion of policy class of the active data migration policy to the original policy class, a level pair of backup storage system resources associated with the original policy class—may be allocated to support the upcoming data migration and garbage collection processes. The level pairs of backup storage system resources, associated with the various policy classes available on the backup storage system, may have been prescribed thereon during a pre-deployment phase of the backup storage system. Furthermore, a level pair may refer to a two-element data tuple encompassing: a first element specifying an amount or percentage of backup storage system resources to be directed to the data migration process; and a second element specifying an amount or percentage of backup storage system resources to be directed to the garbage collection process. Hereinafter, the process proceeds to Step 226.

Figure 3:
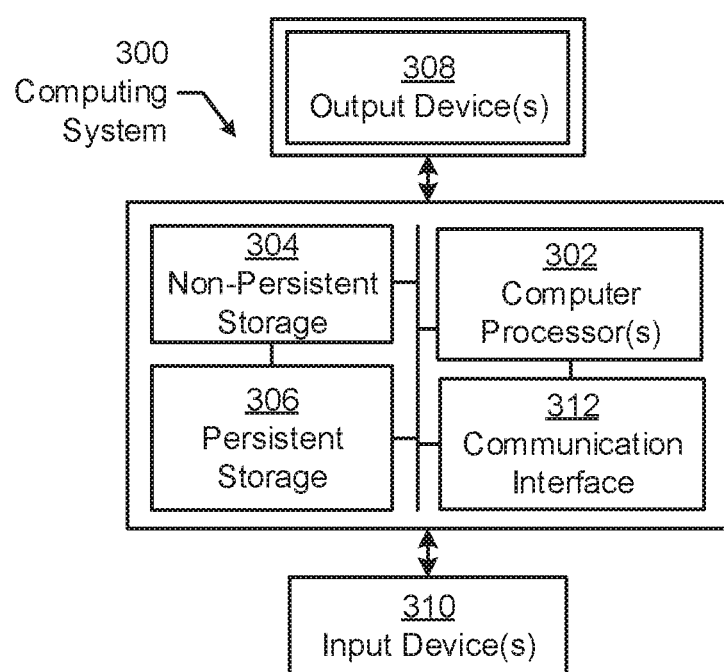
FIG. 3 shows a computing system in accordance with one or more embodiments of the invention.

FIG. 3 shows a computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc. input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a process(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for intelligent data migration, comprising:
identifying criteria for changing policy classes;
selecting an active data migration policy from a set of active data migration policies;
making a first determination that a criterion of the criteria for changing policy classes is met;
changing, based on the first determination, a first policy class of the active data migration policy to a second policy class;
allocating a first level of a system resource associated with the second policy class to support data migration, wherein the system resource comprises compute resources from a computer processor;
performing the data migration of data identified in the active data migration policy using the first level of the system resource;
allocating a second level of the system resource associated with the second policy class to support garbage collection; and
performing the garbage collection on a storage device identified in the active data migration policy using the second level of the system resource.

2. The method of claim 1, wherein the data is one selected from a group consisting of accessed data and cold data.

3. The method of claim 1, wherein the criterion is a used capacity of the storage device meeting a used capacity threshold.

4. The method of claim 1, wherein the data migration of the data comprises performing a data transfer from the storage device to a cloud storage system.

5. The method of claim 4, wherein the data migration of the data further comprises performing the data transfer based on a set of data migration priorities.

6. The method of claim 5, wherein the set of data migration priorities comprises at least one selected from a group consisting of a data size priority, a data criticality priority, and a data retention priority.

7. The method of claim 1, wherein the storage device resides on a backup storage system.

8. The method of claim 1, further comprising:
making a second determination that the criterion is no longer met;
reverting, based on the second determination, the second policy class of the active data migration policy to the first policy class;
allocating a third level of the system resource associated with the first policy class to support data migration; and
continuing the data migration of the data identified in the active data migration policy using the third level of the system resource.

9. The method of claim 8, wherein the first policy class is a lower policy class than the second policy class, wherein the first level of the system resource comprises a lower percentage of the system resource than the third level of the system resource.

10. The method of claim 8, wherein the first policy class is a higher policy class than the second policy class, wherein the first level of the system resource comprises a higher percentage of the system resource than the third level of the system resource.

11. The method of claim 8, further comprising:
allocating a fourth level of the system resource associated with the first policy class to support garbage collection; and
continuing the garbage collection on the storage device identified in the active data migration policy using the fourth level of the system resource.

12. The method of claim 11, wherein the first policy class is a lower policy class than the second policy class, wherein the second level of the system resource comprises a lower percentage of the system resource than the fourth level of the system resource.

13. The method of claim 11, wherein the first policy class is a higher policy class than the second policy class, wherein the second level of the system resource comprises a higher percentage of the system resource than the fourth level of the system resource.

14. The method of claim 1, further comprising:
making a second determination that the criterion is still met;
based on the second determination:
retaining the second policy class of the active data migration policy;
continuing the data migration of the data identified in the active data migration policy using the first level of the system resource; and
continuing the garbage collection on the storage device identified in the active data migration policy using the second level of the system resource.

15. The method of claim 1, further comprising:
prior to making the first determination:
making a second determination that an intelligent class change feature is enabled for the active data migration policy.

16. A system, comprising:
a backup storage system comprising a computer processor configured to:
identify criteria for changing policy classes;
select an active data migration policy from a set of active data migration policies;
make a determination that a criterion of the criteria for changing policy classes is met;
change, based on the determination, a first policy class of the active data migration policy to a second policy class;
allocate a first level of a system resource associated with the second policy class to support data migration, wherein the system resource comprises compute resources from the computer processor;
perform the data migration of data identified in the active data migration policy using the first level of the system resource;
allocate a second level of the system resource associated with the second policy class to support garbage collection; and
perform the garbage collection on a storage device identified in the active data migration policy using the second level of the system resource.

17. The system of claim 16, wherein the backup storage system further comprises:
a storage device operatively connected to the computer processor,
wherein the data identified in the active data migration policy resides in the storage device.

18. The system of claim 17, further comprising:
a cloud storage system operatively connected to the backup storage system,
wherein the data migration of the data comprises performing a data transfer from the storage device to the cloud storage system.

19. A non-transitory computer readable medium (CRM) comprising computer readable program code, which when executed by a computer processor, enables the computer processor to:
identify criteria for changing policy classes;
select an active data migration policy from a set of active data migration policies;
make a determination that a criterion of the criteria for changing policy classes is met;
change, based on the determination, a first policy class of the active data migration policy to a second policy class;
allocate a first level of a system resource associated with the second policy class to support data migration, wherein the system resource comprises compute resources from the computer processor;
perform the data migration of data identified in the active data migration policy using the first level of the system resource;
allocate a second level of the system resource associated with the second policy class to support garbage collection; and
perform the garbage collection on a storage device identified in the active data migration policy using the second level of the system resource.

* * * * *